United States Patent [19]

Ogata et al.

[11] 4,449,676
[45] May 22, 1984

[54] TAPE CASSETTE HAVING A REEL DISPLACEMENT LIMITING MECHANISM

[75] Inventors: Haruki Ogata, Sagamihara; Hiroyuki Umeda, Yokohama, both of Japan

[73] Assignee: Victor Company of Japan, Ltd., Yokohama, Japan

[21] Appl. No.: 390,953

[22] Filed: Jun. 22, 1982

[30] Foreign Application Priority Data

Jun. 30, 1981 [JP] Japan .............................. 56-97438[U]

[51] Int. Cl.³ .......................... G03B 1/04; G11B 15/32
[52] U.S. Cl. ....................................... 242/198; 242/204
[58] Field of Search ................. 242/192, 194, 197–200, 242/204; 360/93, 96.1, 96.5, 132; 354/72–78

[56] References Cited

U.S. PATENT DOCUMENTS

| 3,894,796 | 7/1975 | Cook et al. | 352/72 |
| 3,934,839 | 1/1976 | Serizawa | 242/198 |
| 4,136,843 | 1/1979 | Gourley | 242/198 |
| 4,183,477 | 1/1980 | Iwase et al. | 242/198 |
| 4,309,002 | 1/1982 | Saitou et al. | 242/198 |

*Primary Examiner*—Leonard D. Christian
*Attorney, Agent, or Firm*—Louis Bernat

[57] ABSTRACT

A tape cassette is loaded with respect to a recording and/or reproducing apparatus having a reel driving mechanism including at least one reel driving shaft, where the tape cassette comprises a cassette case, a reel provided within the cassette case, for winding a tape, and a reel displacement limiting mechanism for limiting displacement of the reel. The reel displacement limiting mechanism comprises a first teeth part having crests and valleys, formed on the lower surface of the reel, a second teeth part having crests and valleys, formed on a bottom plate of the cassette case at a position opposing the first teeth part of the reel, an urging mechanism for urging the reel toward the bottom plate of the cassette case so that the first and second teeth parts mesh with each other, and a displacement limiting mechanism for limiting displacement of the reel along a radial direction thereof in a state where the first and second teeth parts are meshed to a quantity smaller than a displacement quantity of the reel along the radial direction thereof in a state where the reel is lifted against the urging force of the urging mechanism and the mesh between the first and second teeth parts is released.

6 Claims, 16 Drawing Figures

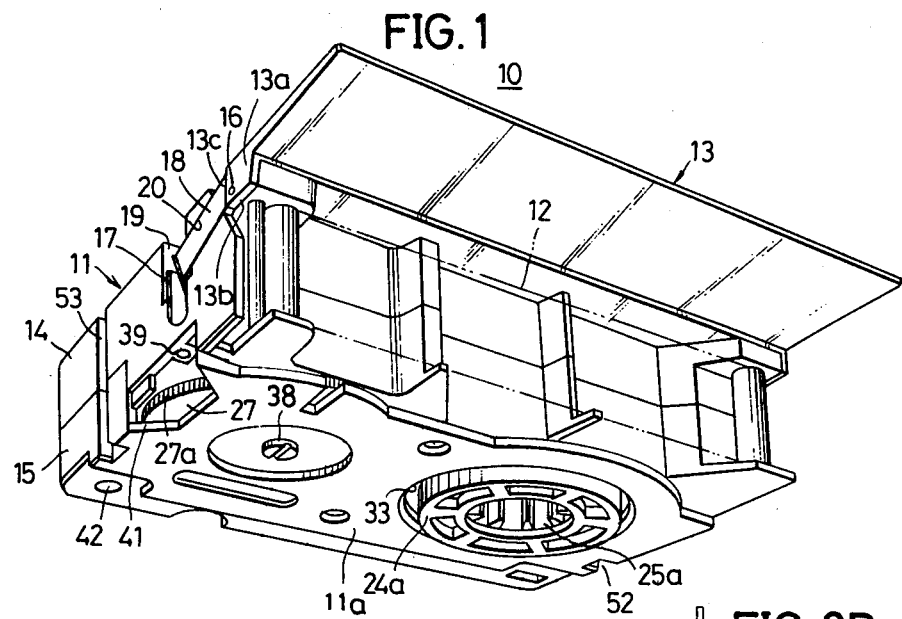
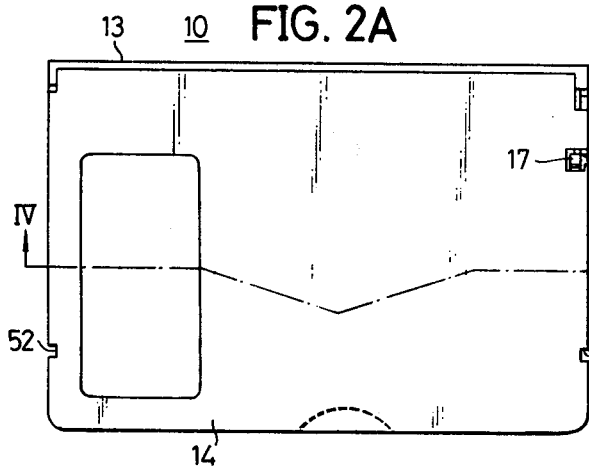
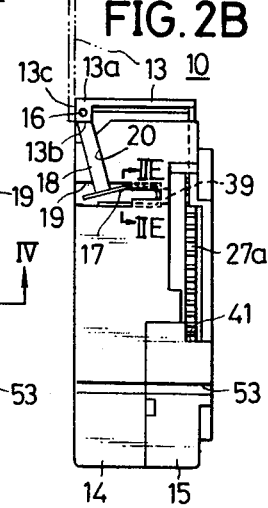
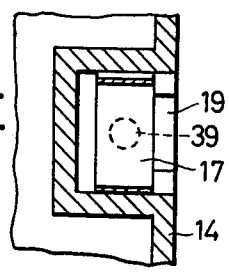

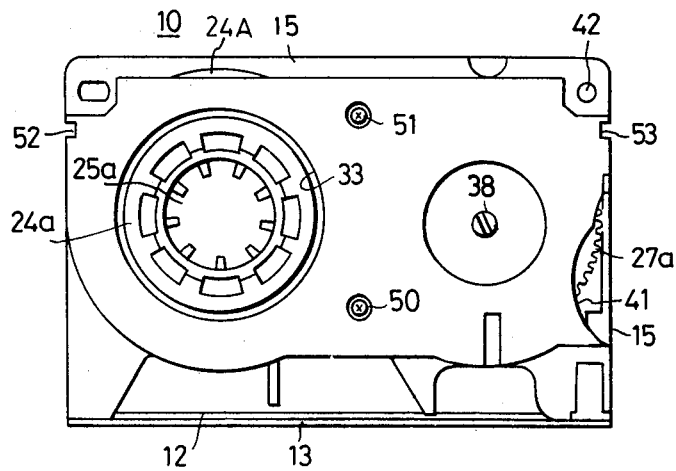
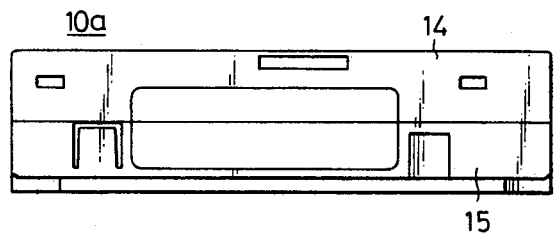
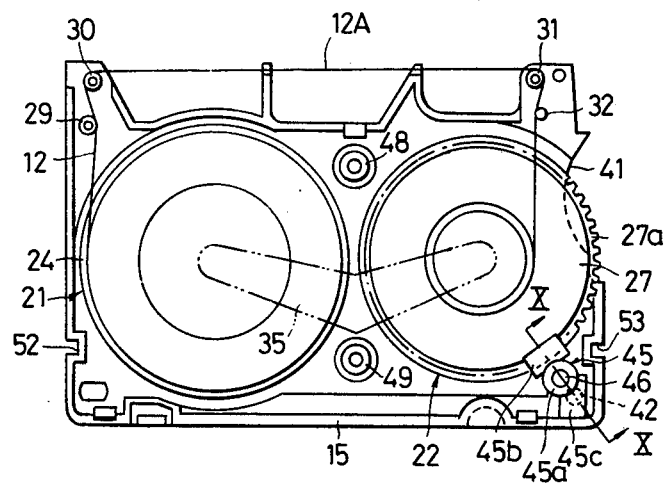

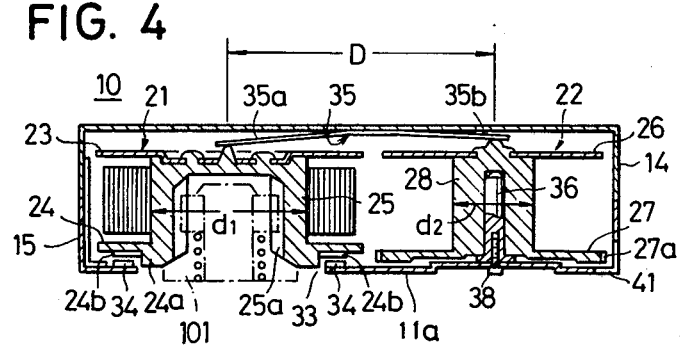
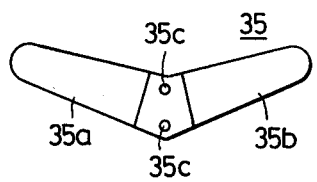
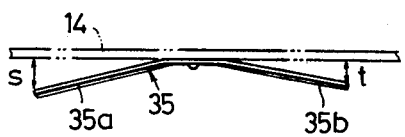
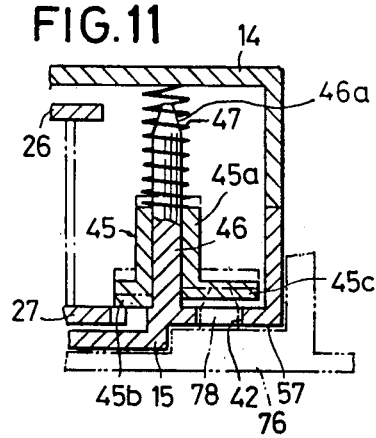

TAPE CASSETTE HAVING A REEL DISPLACEMENT LIMITING MECHANISM

BACKGROUND OF THE INVENTION

The present invention generally relates to tape cassettes having reel displacement limiting mechanisms, and more particularly to a tape cassette having a reel displacement limiting mechanism for limiting unnecessary rotation of a reel and limiting displacement of the reel along a radial direction of the reel to a small range in an unused state where the tape cassette is not loaded into a recording and/or reproducing apparatus, and for releasing the above rotational limitation and permitting displacement of the reel along the radial directions of the reel within a large range in an used state where the tape cassette is loaded into the recording and/or reproducing apparatus.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, the interchangeability exists between apparatuses adopting the same standard. Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. That is, the above formats are standardized for each standard, and a standard type tape cassette and a standard type recording and/or reproducing apparatus are respectively manufactured and marketed under each standard.

Recently, a problem of much importance involves the realization in reducing the size of the recording and/or reproducing apparatus main body. This is to realize a more compact portable type recording and/or reproducing apparatus, and, for example, to realize such an equipment that a recording apparatus is unitarily built into a television camera.

In this regard, some attempts have been made to realize a compact type recording and/or reproducing apparatus using a compact or miniature type tape cassette, which uses a tape pattern and format completely different from those of the standard type recording and/or reproducing apparatus using the standard type tape cassette which are already and widely accepted in the market. However, the above compact type recording and/or reproducing apparatus attempted for realization uses a format completely different from that of the standard type recording and/or reproducing apparatus, and the interchangeability does not exist therebetween. Therefore, in this compact type recording and/or reproducing apparatus, there is a disadvantage in that a tape cassette recorded by the compact type recording and/or reproducing apparatus cannot be reproduced by the standard type recording and/or reproducing apparatus. This is a great inconvenience and disadvantage to the owners of the compact type recording and/or reproducing apparatus.

Another attempt has also been made to realize a compact type portable recording and/or reproducing apparatus which performs recording and/or reproduction with the same tape pattern and format as the standard type recording and/or reproducing apparatus, by using a tape cassette whose size is slightly reduced by reducing the tape quantity and the diameter of the reels from those of the standard type tape cassette. In this system, a tape cassette recorded by the portable recording and/or reproducing apparatus can be reproduced as it is by the standard type recording and/or reproducing apparatus.

However, in the tape cassette used in the above portable recording and/or reproducing apparatus, the distance between a supply reel and a take-up reel is set equal to the distance between the supply and take-up reels of the standard type tape cassette, so that the tape cassette used for the portable recording and/or reproducing apparatus can be loaded into the standard type recording and/or reproducing apparatus. Hence, even when the tape quantity is reduced in order to reduce the diameter of the reels, there is a limit in reducing the diameter of these reels. Therefore, in this system, there was a disadvantage in that the size of the tape cassette as a whole could not be reduced significantly, and the same is true to the recording and/or reproducing apparatus.

Furthermore, another system is conceivable in which the tape quantity is reduced to reduce the diameter of the reels, and further, the miniature type tape cassette is constructed by reducing the distance between the supply and take-up reels. In this system, as a modification of the standard type recording and/or reproducing apparatus, the recording and/or reproducing apparatus can be constructed so that a reel disc for driving the take-up reel is movable. In this modification of the standard type recording and/or reproducing apparatus, the take-up reel disc is at a normal position when loaded with the standard type tape cassette, and the take-up reel disc is moved to a position closer to the supply reel disc when loaded with the miniature type tape cassette.

However, even in this system, for example, there is a disadvantage in that the miniature type tape cassette recorded by the compact type recording and/or reproducing apparatus cannot be reproduced by the standard type recording and/or reproducing apparatus which is presently in wide use. Moreover, there is a disadvantage in that it is extremely difficult to realize a mechanism for moving the reel disc in the manner described above. Furthermore, the recording and/or reproducing apparatus using the tape cassette generally has a mechanism for drawing out the tape from inside the tape cassette to load the tape onto a predetermined tape path within the recording and/or reproducing apparatus. Therefore, it is also exceedingly difficult to construct the above mechanism for pulling out the tape, so that interchangeability exists with respect to the above compact or miniature type tape cassette and the standard type tape cassette. Practically, the realization of such a mechanism is virtually impossible.

Accordingly, in a U.S. patent application Ser. No. 322,174 filed on Nov. 17, 1981 entitled "TAPE CASSETTE", in which the assignee is the same as that of the present application, a novel and useful tape cassette which has overcome the above described disadvantages was proposed, and this novel tape cassette is now being realized.

In the above previously proposed tape cassette, a braking mechanism is provided to prevent unnecessary rotation of the reels. This mechanism is provided so that the supply reel and the take-up reel within the cassette case do not rotate unnecessarily when the tape cassette is not used. Accordingly, slack is prevented from being introduced in the tape, and the tape is prevented from being excessively exposed outside the cassette case. To be more concrete, a braking mechanism is provided with respect to the take-up reel so that when the tape cassette is not used, braking is performed with respect to the peripheral edge of a reel flange so that the take-up reel does not rotate, and when the tape cassette is loaded into a tape cassette adapter or a recording and/or reproducing apparatus, the above braking is released. In addition, with respect to the supply reel, a braking mechanism is provided wherein a first teeth are provided in a ring shape on the lower surface of a reel flange, a second teeth are provided in a ring shape on a bottom plate of the cassette case at positions corresponding to the teeth formed on the lower surface of the reel flange, and a spring is provided to urge the supply reel downwards. In the braking mechanism provided with respect to the supply reel, the teeth of the reel flange of the supply reel which is urged downwards, mesh with the teeth provided on the bottom plate of the cassette case, to prevent unnecessary rotation of the reel. When the tape cassette is loaded into the recording and/or reproducing apparatus directly, or in a state accommodated within the adapter, a reel driving shaft of the apparatus enters into a center hole of the supply reel to lift up the supply reel. Hence, in this case, the above teeth are disengaged from the meshed state, and the braking with respect to the supply reel is released.

However, the above described tape cassette is constructed so that the reel driving shaft of the recording and/or reproducing apparatus enters into the center hole of the supply reel, and the supply reel is not axially supported on a fixed shaft within the cassette case like the take-up reel. Hence, measures must be taken so that the supply reel in the tape cassette is slightly displaceable along the radial direction of the supply reel, and centers of the center hole of the supply reel and the reel driving shaft of the recording and/or reproducing apparatus coincide, to ensure positive entrance of the reel driving shaft into the center hole of the supply reel, when the tape cassette is loaded into the apparatus independently or in a state accommodated within the tape cassette adapter.

On the other hand, in an unused state where the tape cassette is not loaded into the recording and/or reproducing apparatus, in addition to preventing unnecessary rotation of the above reels, measures must be taken so that the reel does not move unnecessarily along the radial direction of the reel, in order to prevent the tape from being slackened.

SUMMARY OF THE INVENTION

Accordingly, it is a general object of the present invention to provide a novel and useful tape cassette having a reel displacement limiting mechanism, in which the above described demands have been satisfied.

Another and more specific object of the present invention is to provide a tape cassette having a reel displacement limiting mechanism constructed to limit unnecessary rotation of a reel and limiting displacement (play) of the reel along a radial direction of the reel to a small range in an unused state where the tape cassette is not loaded into a recording and/or reproducing apparatus, and to release the above rotational limitation and permitting displacement of the reel along the radial direction of the reel within a large range in an used state where the tape cassette is loaded into the recording and/or reproducing apparatus. According to the tape cassette of the present invention, the tape is prevented from being slackened within a cassette case in the unused state. Moreover, a reel driving shaft of the apparatus positively enters into a center hole of the reel to ensure positive loading, upon loading of the tape cassette into the apparatus.

Other objects and further features of the present invention will be apparent from the following detailed description when read in conjunction with the accompanying drawings.

BRIEF DESCRIPTION OF THE DRAWINGS

FIG. 1 is a perspective view showing a tape cassette according to the present invention in a state where a tape protecting lid is open, viewed from a lower direction with respect to the front of the tape cassette;

FIGS. 2A, 2B, 2C, and 2D are diagrams respectively showing a plan view, a side view, a bottom view, and a rear view of the tape cassette shown in FIG. 1;

FIG. 2E is a plan view, in an enlarged scale, showing a cross section of the tape cassette shown in FIG. 2B along a line IIE—IIE;

FIG. 3 is a plan view showing the inner construction of the tape cassette shown in FIG. 1 in a state where an upper half of a cassette case and an upper flange of a reel are removed;

FIG. 4 is a diagram showing a cross section along a line IV—IV in FIG. 2A;

FIGS. 5A and 5B are diagrams respectively showing a plan view and a front view of an embodiment of a leaf spring for pushing against a reel;

FIG. 11 is a diagram showing a brake mechanism for a take-up reel, in a cross section along a line X—X in FIG. 3.

DETAILED DESCRIPTION

Figure 6:
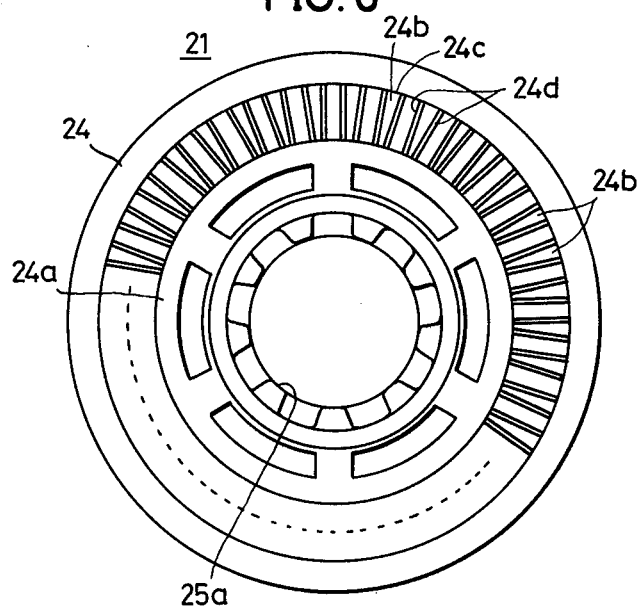
FIG. 6 is a view showing a bottom surface of a supply reel flange which is a constituting element of an embodiment of a reel displacement limiting mechanism in a tape cassette according to the present invention.

A miniature type tape cassette 10 according to the present invention has a configuration shown in FIGS. 1, 2A through 2E, 3, and 4. The tape cassette 10 has a cassette case 11 of a size smaller than a standard type tape cassette which is loaded into a standard type recording and/or reproducing apparatus. A lid 13 for protecting a magnetic tape 12 accommodated within the tape cassette 10, is provided on the front of the cassette case 11. The cassette 11 consists of an upper half 14 and a lower half 15.

A part of a rectangular-shaped side flange part 13a of the lid 13 is axially supported by a hinge pin 16 at a part in the vicinity of a corner part of the upper half 14, so that the lid 13 is rotatable to open and close. A substantially U-shaped leaf spring 17 and a slide rod 18 which is urged in the direction of the hinge pin 16 by the leaf spring 17, are provided in relation to the above lid 13. The lid 13 can assume two states. That is, in one state, one side edge 13b of the flange part 13a is pushed by the slide rod 18, and the lid 13 is in a closed state shown in FIG. 2B. Further, in another state, another side edge 13c of the flange part 13a is pushed by the slide rod 18, and the lid 13 is an open state shown in FIG. 1 and as indicated by a two-dot chain line in FIG. 2B. The U-shaped leaf spring 17 is fitted into a side groove 19 of the upper half 14. The slide rod 18 is provided within a groove 20 at the side of the upper half 14, in a freely slidable manner. Moreover, when the tape cassette 10 is not loaded into a recording and/or reproducing apparatus designed exclusively for the tape cassette 10 or accommodated within a tape cassette adapter (description with respect to the recording and/or reproducing apparatus designed exclusively for the tape cassette 10 and the tape cassette adapter will be given afterwards), the lid 13 covers the front of the cassette case 11 to protect the magnetic tape 12 which is exposed at the front of the cassette case 11.

A hole 39 connects to the side groove 19 from the lower surface of the upper half 14. The opening of the hole 39 to the groove 19 opposes the lower end of the leaf spring 17, as shown in FIG. 2E. If the leaf spring 17 is erroneously fitted into the groove 19 with the right and left sides reversed when assembling the tape cassette 10, inconveniences will be introduced due to the difference in lengths of right and left arms of the leaf spring 17. Accordingly, in such a case where the leaf spring 17 is erroneously fitted, it becomes necessary to once remove the leaf spring 17 from the groove 19. In addition, the leaf spring 17 will lose its resiliency when the tape cassette 10 is used for a long period of time. In this kind of a case, it becomes necessary to remove and replace the leaf spring 17 in the groove 19. When removing the leaf spring 17 from the groove 19 in the above described cases, a removing 1 pin (not shown) is inserted from the lower part of the hole 39 to push the leaf spring 17 upwards from therebelow. By use of this removing pin, the leaf spring 17 is easily removed from the groove 19.

In addition, as shown in FIGS. 3 and 4, a supply reel 21 and a take-up reel 22 are provided side by side within the cassette case 11. A distance D between centers of the reels 21 and 22 is shorter than the distance between centers of supply and take-up reels of a standard type tape cassette used with respect to a standard type recording and/or reproducing apparatus. With respect to the supply reel 21, the magnetic tape 12 is wound around a reel hub 25 between upper and lower flanges 23 and 24. Similarly, the magnetic tape 12 is wound around a reel hub 28 between upper and lower flanges 26 and 27, with respect to the take-up reel 22. The magnetic tape 12 is unwound from the supply reel 21 and guided by guide poles 29, 30, 31, and 32 provided at left and right end sides, along the front side of the cassette case 11, to form a tape path 12A reaching the take-up reel 22.

Figure 7:
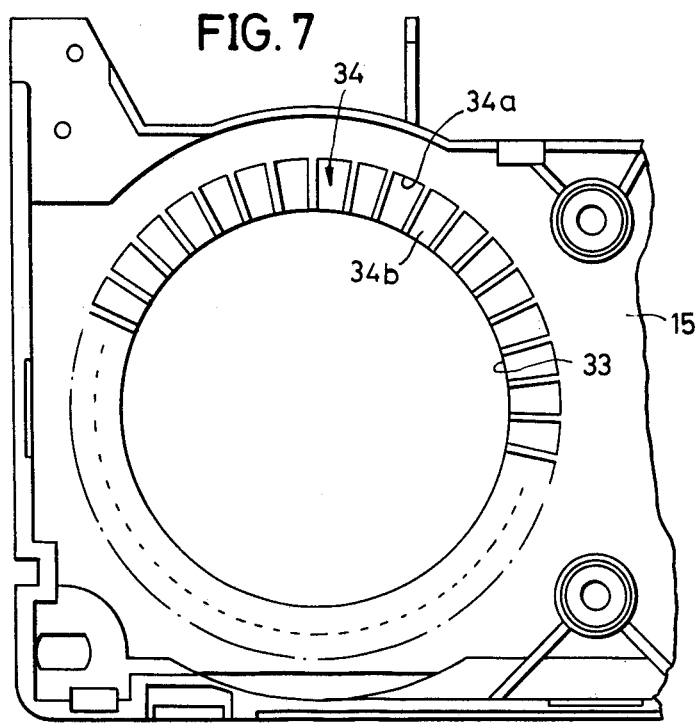
FIG. 7 is a plan view showing an essential part of a bottom plate of a cassette case which constructs a reel displacement supply reel flange shown in FIG. 6.
Figure 8A:
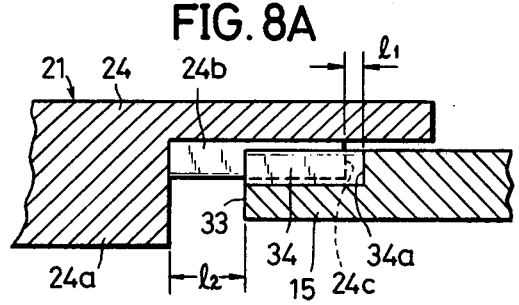
FIGS. 8A and 8B are views in cross section respectively showing a part of a reel displacement limiting mechanism in a meshed state and in a mesh released state.

The supply reel 21 is provided in a state where an annular projecting step portion 24a of the lower flange 24 is loosely fitted into a hole 33 having a large diameter of the lower half 15. Moreover, teeth 24b are formed in a ring shape on the bottom surface of the lower flange 24 around the entire circular periphery thereof as shown in FIG. 6. Each tooth in the teeth 24b is wedge-shaped in the radial direction, and the width is narrower at the inner periphery and wider at the outer periphery thereof. Tapered surfaces 24d are formed on both sides of each tooth. Teeth 34 are formed in a ring shape on the upper surface of a bottom plate of the lower half 15, at positions opposing the above teeth 24b, as shown in FIG. 7. A displacement limiting mechanism with respect to the supply reel 21 is constructed by these teeth 24b and 34. The supply reel 21 is urged downwards to the lower half 15, by one arm portion 35a of a leaf spring 35 mounted on the lower surface of an upper plate of the upper half 14. Accordingly, in a normal state, crest parts and valley parts of the teeth 24b mesh with valley parts and crest parts of the teeth 34 as shown in FIG. 8A. Hence, the supply reel 21 is braked and prevented from rotating unnecessarily when the tape cassette 10 is not used, due to the above meshing of the teeth 24b and 34.

Figure 8B:
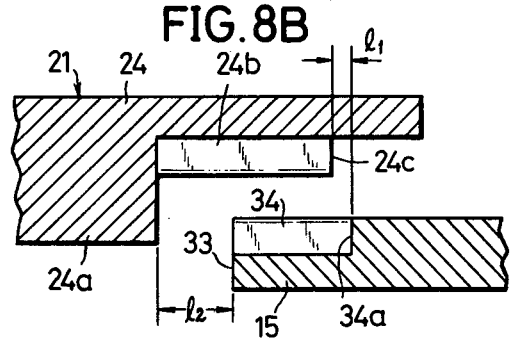

As shown in FIGS. 8A and 8B, when the supply reel 21 is at a position where the center of the annular projecting step portion 24a coincides with the center of the hole 33 in the lower half 15, there is a distance l2 between the outer peripheral surface of the annular projecting step portion 24a and the inner peripheral surface of the hole 33. In addition, a distance l1 between a tip end part 24c of the teeth 24b and a step part 34a of the teeth 34 is selected so as to satisfy a relation l1<l2. In an example of concrete numerical values, the length of the teeth 24b along the radial direction is 5 mm, the length of the teeth 34 along the radial direction is 4 mm, the distance l1 is 0.5 mm, and the distance l2 is 1.5 mm.

As described above, when the tape cassette 10 is not used, the supply reel 21 is urged towards the lower half 15 by the leaf spring 35. Thus, the teeth 24b mesh with the teeth 34 as shown in FIG. 8A. In this state, when the supply reel 21 moves towards the right hand side in FIG. 8A by a distance l1, the tip end part 24c of the teeth 24b abuts the step part 34a of the teeth 34 and is prevented from further movement. Similarly, the supply reel 21 can also move towards the left hand side in FIG. 8A by a distance l1. Accordingly, the displacement of the supply reel 21 along the radial direction thereof, is limited within a range of a distance 2l1 (1 mm in the case of the above numerical example). Therefore, the displacement (play) of the supply reel 21 along the radial direction thereof, is limited to an exceedingly small range.

By preventing the rotation of the supply reel 21 and the displacement (play) of the supply reel 21 along the radial direction thereof, unnecessary slack or tension is prevented from being introduced to the magnetic tape 12 which is wound around the supply reel 21 when the tape cassette 10 is transported. Hence, the tape 12 is accordingly prevented from being damaged.

When the tape cassette 10 is loaded into the recording and/or reproducing apparatus, a reel driving shaft 101 of the apparatus enters into a reel driving shaft inserting part 25a in the hub 25 of the supply reel 21 as shown in FIG. 4, to lift up the supply reel 21. As the supply reel 21 is lifted up, the meshing engagement between the teeth 24b and 34 is released as shown in FIG. 8B. Thus, the supply reel 21 is put into a state where the supply reel 21 can rotate together with the reel driving shaft 101.

During the process in which the reel driving shaft 101 enters into the reel driving shaft inserting part 25a and the supply reel 21 is lifted up, the supply reel 21 can move towards the right hand side in FIG. 8B by a distance l2 from the time when the meshing engagement between the teeth 24b and 34 is released until the time when the outer peripheral surface of the annular projecting step portion 24a abuts the inner peripheral surface of the hole 33. Similarly, the supply reel 21 can also move towards the left hand side in FIG. 8B by a distance l2. Accordingly, the supply reel 21 can undergo displacement along the radial direction thereof, by a distance 2l2 (3 mm in the case of the above numerical example). Hence, even if the center of the reel driving shaft inserting part 25a of the supply reel 21 does not coincide with the center of the reel driving shaft 101 of the recording and/or reproducing apparatus upon loading of the tape cassette into the apparatus, the supply reel 21 can undergo displacement within a range of a distance 2l2 to ensure positive entrance of the reel driving shaft 101 into the reel driving shaft inserting part 25a.

The step part 34a of the teeth 34 is not limited to the perpendicularly formed shape, and may be inclined.

In the above described embodiment, the reel displacement limitation in the state where the teeth 24b and 34 mesh, is effected by the contact between the tip end part 24c of the teeth 24b and the step part 34a of the teeth 34. However, the reel displacement limitation may also be effected by the following measures. That is, valley parts 34b of the teeth 34 in the lower half 15 may respectively be formed in a wedge shape slightly larger than the shape of each tooth of the teeth 24b as shown in FIG. 9, wherein the width of the valley parts 34b is narrower at the inner periphery and wider at the outer periphery.

Figure 9:
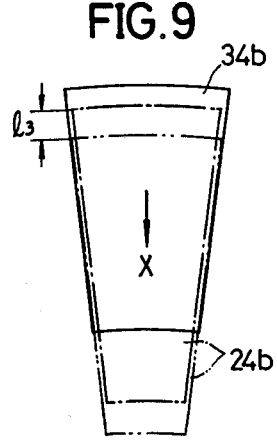
FIG. 9 is a diagram for explaining the engaging state of teeth.

When the supply reel 21 moves towards the left hand side in FIG. 8A if the above valley parts 34b are shaped as shown in FIG. 9, the tooth of the teeth 24b is displaced from the position indicated by a one-dot chain line to a position indicated by a two-dot chain line in FIG. 9. Because the sidth of the valley parts 34b is such that the teeth 34 are narrow at the inner periphery and wider at the outer periphery, both sides of the tooth of the teeth 24b make contact with both sides of the valley part 34b, and the teeth 24b is prevented from further displacement towards the direction of an arrow X. The teeth 24b can thus only undergo displacement by a distance l3, where l3 is selected to satisfy a relation l3 < l2. Accordingly, the displacement (slippage) of the supply reel 21 along the radial direction thereof is limited when the tape cassette 10 is not used.

As will be described hereinafter when the tape cassette 10 is loaded into a tape cassette adapter 60 shown in FIG. 10, the supply reel 21 receives a force to rotate clockwise in FIGS. 3 and 10 due to tension in the tape 12. In this state, since the tapered surfaces 24d are formed on the teeth 24b as described above, the crest part of the teeth 24b easily rides over the crest part of the teeth 34. This means that the reel 21 can rotate. Accordingly, the tape 12 can be drawn outside the cassette case 11 without an excessive force being applied to the tape. Hence, the tape 12 is prevented from being damaged by stretching, breaking, and the like. Moreover, it is unnecessary to perform operations such as lifting the reel 21 by the operator's finger. The meshing strength between the teeth 24b having the above tapered surfaces 24d and the teeth 34 is such that, the reel 21 will not rotate unnecessarily when the tape cassette 10 is not used even when shock and the like is applied upon transport, for example, and the crest part of the teeth 24b having the tapered surfaces 24d will ride over the crest part of the teeth 34 when a force is applied to the tape 12 to draw the tape out so that an excessive force is not applied to the tape and the reel 21 is allowed to rotate. The configurations of the teeth 24b and 34, and the urging force exerted by the leaf spring 35 are determined so as to obtain such meshing strength described above.

The take-up reel 22 is provided in a rotatable manner such that a fixed shaft 36 fixed at the lower half 15 by a screw 38 is inserted into a center hole of the reel hub 28. The above take-up reel 22 is urged towards the lower half 15 by being pushed downwards by another arm portion 35b of the leaf spring 35. Since the reel hub 28 is not inserted with a reel driving shaft, an outer diameter d2 of the reel hub 28 is smaller than an outer diameter d1 of the reel hub 25 of the supply reel 21. Accordingly, the amount of magnetic tape 12 which can be accommodated within the tape cassette 10 becomes large as compared to the case where the outer diameters d1 and d2 of the reel hubs 25 and 28 are the same. Therefore, although the size of the tape cassette 10 is small, recording and reproduction can be performed for a relatively long period of time by use of the above tape cassette 10.

As shown in FIGS. 5A and 5B, the above leaf spring 35 is of a V-shape and is adhered and fixed in a state where a pair of holes 35c at the center thereof is fitted over projections at the lower surface of the upper plate of the upper half 14. The leaf spring 35 is shaped so that, in a free state, a bent amount s of the arm portion 35a which makes contact with the supply reel 21 is larger than a bent amount t of the other arm portion 35b which makes contact with the take-up reel 22. Hence, the resilient force exerted by the arm portion 35a is especially large. When the tape cassette 10 is not used, even if tapered surfaces are formed on the teeth 24b and/or the teeth 34, the supply reel 21 is pushed against the lower half 15 with a strong force, and the rotation of the supply reel 21 is spositively prevented. On the other hand, when the tape cassette 10 is being used, the position of the supply reel 21 is positively secured by a supply reel driving shaft, to stabilize the magnetic tape travel.

In addition, gear teeth 27a are formed on the entire outer peripheral part of the lower flange 27 of the take-up reel 22. As shown in FIGS. 1, 2B, 2C, 3, and 4, a part of the outer peripheral part of the lower flange 27 is exposed through a cutout window 41 which extends from the side to the bottom of the lower half 15.

Furthermore, with respect to the take-up reel 22, a braking mechanism shown in FIG. 3 is provided. FIG. 11 shows this braking mechanism in a cross section along a line X—X in FIG. 3. A braking member 45 consists of a brake shoe part 45b provided on one side of a cylindrical part 45a, and a rectangular engaging part 45c provided on the opposite side of the cylindrical part 45a. The above braking member 45 is provided in a state where the cylindrical part 45a is fitted over a projecting column 46 on the lower half 15, the brake shoe part 45b opposes an outer peripheral edge part at the upper surface of the reel flange 27, and the engaging part 45c is positioned at a corner part of the lower half 15. The braking member 45 is restricted of rotation, especially since the engaging part 45c is positioned at the corner part of the lower half 15. Moreover, the braking member 45 is urged towards the lower half 15 by a compressed coil spring (not shown) fitted over around the periphery of the projecting column 46, and the brake shoe part 45b presses against the outer peripheral edge part at the upper surface of the reel flange 27. Accordingly, in the state where the tape cassette 10 is not used, the take-up reel 22 is subjected to the braking action due to the force of friction introduced when the brake shoe part 45b presses against the outer peripheral edge part at the upper surface of the flange 27, and is stopped at this position. Thus, no slack is introduced in the magnetic tape 12 which is wound around the take-up reel 22. Furthermore, the engaging part 45c of the braking member 45 covers a positioning hole 42 formed in the lower half 15, as shown in FIG. 11.

Next, description will be given with respect to the manipulation and operation involved in a case where the above described tape cassette 10 loaded to the standard type recording and/or reproducing apparatus together with the tape cassette adapter 60, by referring to FIG. 10.

In this case, the tape cassette 10 is accommodated within the tape cassette adapter 60 to form the above described predetermined tape path within the tape cassette adapter 60. This tape cassette adapter 60 accommodating the tape cassette 10 is loaded into the standard type recording and/or reproducing apparatus as in the case where the standard type tape cassette is loaded.

In order to accommodate the tape cassette 10 within the tape cassette adapter 60, the lid 13 of the tape cassette 10 is first opened as shown in FIG. 1. Then, the magnetic tape 12 is drawn out from the tape cassette 10 by a predetermined length. In this state, the magnetic tape 12 can be drawn out from the supply reel 21 or the take-up reel 22 by rotating the supply reel 21 or rotating the take-up reel 22 against the braking force of friction, and it is not necessary to push the supply reel 21 upwards by a finger in order to release the braking effect. In a state before the tape cassette 10 is used, all of the magnetic tape 12 is wound around the supply reel 21 in most cases. Thus, in reality, the supply reel 21 rotates, and the magnetic tape 12 is usually drawn out from the supply reel 21. Even in such a case, the supply reel 21 can rotate smoothly as described above, to allow the tape 12 to be drawn out smoothly. In addition, it is not necessary to hold the lid 13 in the open position by a finger, since the lid 13 is mechanically held at the open position. Hence, the manipulation to draw out the magnetic tape 12 from the above tape cassette 10, and the succeeding manipulation to accommodate the tape cassette 10 within the tape cassette adapter 60, can be performed with ease. In the state where the magnetic tape 12 is drawn out from the tape cassette 10, the tape cassette 10 is accommodated within the accommodating part of the tape cassette adapter 60, and the magnetic tape 12 which is drawn out is threaded around guide poles 93 and 94 so as to be guided by these guide poles 93 and 94 as shown by a dotted line in FIG. 10. Accordingly, the magnetic tape 12 is guided by these guide poles 93 and 94, and forms the tape path 12B traversing the front surfaces of cutouts 90, 91, and 92, as in the case of the standard type tape cassette.

The teeth 27a of the lower flange 27 which is exposed through the cutout window 41 at the take-up reel 22, mesh with the teeth of the intermediate gear 80 provided within the tape cassette adapter 60 when the tape cassette 10 is lowered. In addition, a pin (not shown) provided within the tape cassette adapter 60 passes through the hole 42 to push the engaging part 45c. Hence, the pin pushes the braking member 45 upwards against the force exerted by the coil spring, that is, towards the axial direction of the take-up reel 22. Therefore, the brake shoe part 45b disengages from the lower flange 27, and the take-up reel 22 is released of the braking operation.

Figure 10:
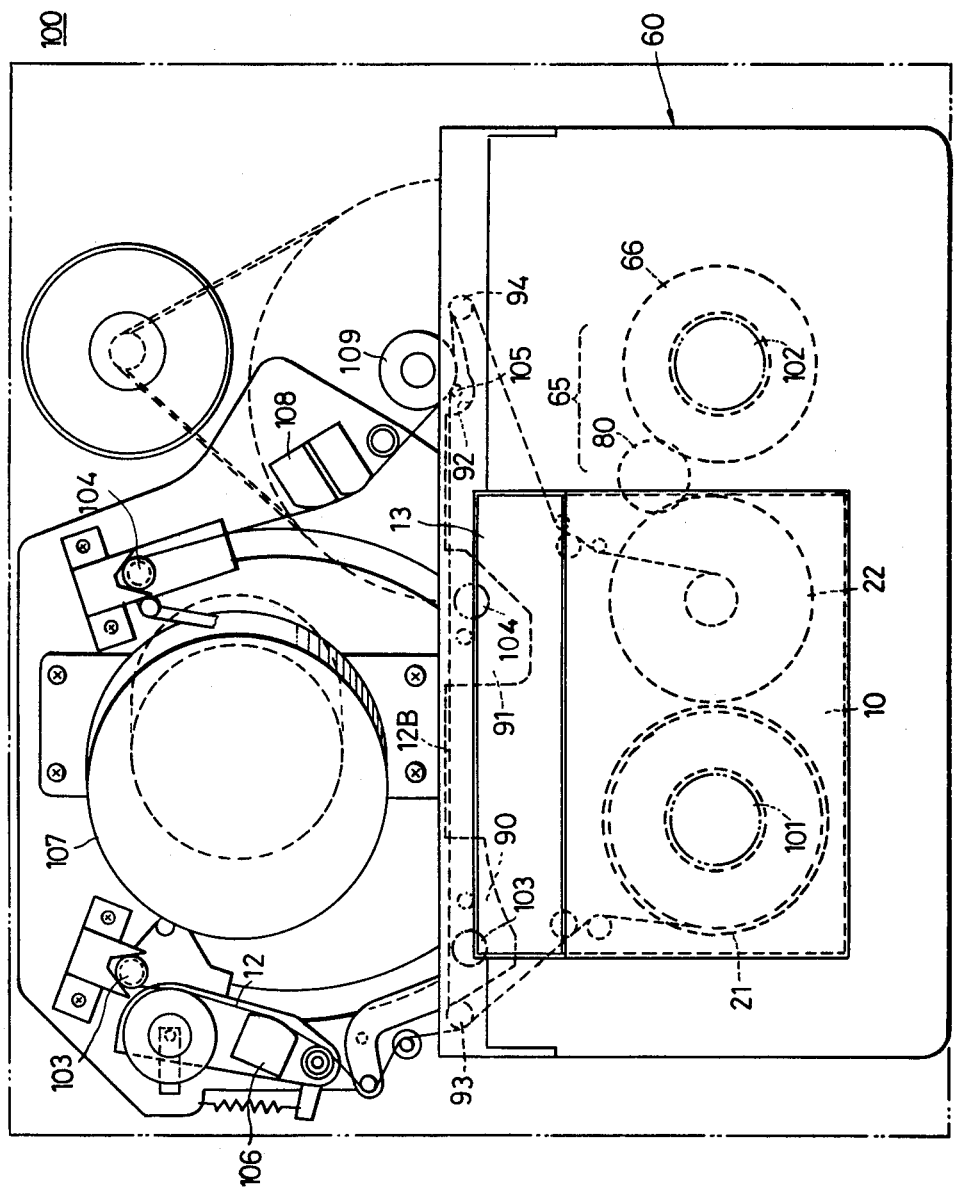
FIG. 10 is a plan view showing an example of a standard type recording and/or reproducing apparatus loaded with a tape cassette adapter which is accommodating a tape cassette, in a recording or reproducing mode.

As shown in FIG. 10, the tape cassette adapter 60 accommodating the tape cassette 10 is loaded into a standard type recording and/or reproducing apparatus 100, similarly as in the case where the standard type tape cassette is loaded.

That is, by loading the tape cassette adapter 60, a supply reel driving shaft 101 is inserted into the reel driving shaft inserting part 25a of the supply reel 21 of the tape cassette 10. On the other hand, a take-up reel driving shaft 102 is inserted into the reel driving shaft inserting part 66c of the gear structure 66 within the tape cassette adapter 60. In addition, loading poles 103 and 104 and a capstan 105 respectively enter into the cutouts 90, 91, and 92 behind the tape path 12B so as to oppose the inner side of the tape path 12B. In addition, in the above loaded state, the supply reel 21 is pushed upwards by the supply reel driving shaft 101 as shown in FIGS. 4 and 8B. Accordingly, the mesh between the teeth 24b and the teeth 34 is completely released, and the supply reel 21 becomes freely rotatable. Moreover, the supply reel 21 is movable in the radial direction thereof, to ensure positive entrance of the reel driving shaft 101 into the reel driving shaft inserting part 25a.

Upon a tape loading operation, the above loading poles 103 and 104 respectively intercept and engage with the magnetic tape 12, then draw the magnetic tape 12 out of the cassette as the loading poles 103 and 104 move away from the cutouts 90 and 91, and reach positions indicated by solid lines in FIG. 10. Accordingly, the magnetic tape 12 which is drawn outside the tape cassette adapter 60, makes contact with a full-width erasing head 106, and makes contact with a guide drum 107 provided with rotary video heads throughout a predetermined angular range. The magnetic tape 12 further makes contact with an audio and control head 108. Therefore, the above magnetic tape 12 is loaded onto a predetermined tape travelling path.

During recording and reproduction, the magnetic tape 12, is driven in a state pinched between the capstan 105 and a pinch roller 109. Moreover, the gear structure 66 within the tape cassette adapter 60 is rotated in the clockwise direction by the take-up reel driving shaft 102. This rotation of the gear structure 66 is transmitted to the take-up reel 22 through the intermediate gear 80, to drive the magnetic tape 12 towards a tape take-up direction. Accordingly, the magnetic tape 12 fed out by the capstan 105 is taken-up by the take-up reel 22. The magnetic tape 12 is guided by the guide pole 94 within the tape cassette adapter 60.

Further, the present invention is not limited to these embodiments, but various variations and modifications may be made without departing from the scope of the present invention.

What is claimed is:

1. A tape cassette loaded with respect to a recording and/or reproducing apparatus having a reel driving mechanism including at least one reel driving shaft, said tape cassette comprising a cassette case, a reel provided within said cassette case, for winding a tape, and a reel displacement limiting mechanism for limiting displacement of said reel, said reel displacement limiting mechanism comprising: a first teeth part having crests and valleys, formed on the lower surface of said reel; a second teeth part having crests and valleys, formed on a bottom plate of said cassette case at a position opposing the first teeth part of said reel; urging means for urging said reel towards the bottom plate of said cassette case so that said first and second teeth parts mesh with each other; and displacement limiting means for limiting displacement of said reel along a radial direction thereof in a state where said first and second teeth parts are meshed to a quantity smaller than a displacement quantity of said reel along the radial direction thereof in a state where said reel is lifted against the urging force of said urging means and said mesh between said first and second teeth parts is released.

2. A tape cassette as claimed in claim 1 in which said valleys of said second teeth part meshing with said crests of said first teeth part are formed as valley parts in the bottom plate of said cassette case, said displacement limiting means comprises tip end parts of the crests of said first teeth part and depressed step parts of the valleys of said second teeth part, and the tip end parts of the crests of said first teeth part abut the depressed step parts of the valleys of said second teeth part in a state where said first and second teeth parts mesh to limit displacement of said reel along the radial direction thereof.

3. A tape cassette as claimed in claim 2 in which said cassette case comprises a hole in the bottom plate through which a reel driving shaft of said recording and/or reproducing apparatus enters, said reel comprises a projecting step portion loosely fitting into said hole in said cassette case, said displacement limiting means further comprises an outer peripheral surface of the projecting step part of said reel and an inner peripheral surface of the hole in said cassette case, and the outer peripheral surface of the projecting step part of said reel abuts the inner peripheral surface of the hole in said cassette case in a state where said first and second teeth parts mesh to limit displacement of said reel along the radial direction thereof.

4. A tape cassette as claimed in claim 3 in which the displacement quantity of said reel along the raidal direction thereof limited in the state where said first and second teeth parts mesh, is smaller than the displacement quantity of said reel along the radial direction thereof limited in the state where said mesh between said first and second teeth parts is released.

5. A tape cassette as claimed in claim 1 in which said cassette case comprises a hole in the bottom plate through which a reel driving shaft of said recording and/or reproducing apparatus enters, said second teeth part is formed in a ring-shape along the periphery of said hole, the valleys of said second teeth part meshing with the crests of said first teeth part having side walls with a shape such that the width decreases towards the center of said hole, said displacement limiting means comprises side walls of the crests of said first teeth part and the side walls of the valleys of said second teeth part, and the side walls of the crests of said first teeth part abuts the side walls of the valleys of said second teeth part to limit displacement of said reel along the radial direction thereof.

6. A tape cassette as claimed in claim 4 in which a maximum displacement quantity of said reel along the radial direction thereof limited in the state where said first and second teeth parts mesh is selected to 1 mm, and a maximum displacement quantity of said reel along the radial direction thereof limited in the state where said mesh between said first and second teeth parts is released is selected to 3 mm.

* * * * *